(12) United States Patent
Alsaid

(10) Patent No.: US 8,328,224 B1
(45) Date of Patent: Dec. 11, 2012

(54) RECEIVER HITCH ASSEMBLY

(76) Inventor: Masoud Motlaq Alsaid, Alkousor (KW)

( * ) Notice: Subject to any disclaimer, the term of this patent is extended or adjusted under 35 U.S.C. 154(b) by 0 days.

(21) Appl. No.: 13/219,572

(22) Filed: Aug. 26, 2011

(51) Int. Cl.
*B60D 1/06* (2006.01)
*B60D 1/44* (2006.01)

(52) U.S. Cl. .................. 280/511; 280/491.2; 280/495

(58) Field of Classification Search .............. 280/490.1, 280/491.1, 491.2, 495, 511
See application file for complete search history.

(56) References Cited

U.S. PATENT DOCUMENTS

| | | | | |
|---|---|---|---|---|
| 2,978,260 | A | * | 4/1961 | Hebeisen ............. 280/495 |
| 4,280,713 | A | | 7/1981 | Bruhn |
| 5,277,448 | A | | 1/1994 | Colibert |
| 5,358,269 | A | * | 10/1994 | Jakeman et al. ........ 280/490.1 |
| 5,489,111 | A | | 2/1996 | Collins |
| 6,126,189 | A | * | 10/2000 | Venis .................. 280/511 |
| 6,305,702 | B1 | * | 10/2001 | Alford, II ............. 280/204 |
| 6,874,804 | B2 | | 4/2005 | Reese et al. |
| 6,969,084 | B2 | | 11/2005 | Kaepp et al. |
| 2004/0232653 | A1 | | 11/2004 | Kaepp et al. |
| 2005/0212311 | A1 | | 9/2005 | Haneda et al. |
| 2007/0267846 | A1 | * | 11/2007 | Carraway ............. 280/495 |

FOREIGN PATENT DOCUMENTS

AU 2007-100991 11/2007

OTHER PUBLICATIONS

Website, http://www.etrailer.com/p-V76452.html, Valley Stealth Trailer Hitch Verticle Ball Mount, two sheets printed from the internet on May 4, 2011.

* cited by examiner

*Primary Examiner* — Lesley D Morris
*Assistant Examiner* — Marc Scharich
(74) *Attorney, Agent, or Firm* — Richard C. Litman

(57) ABSTRACT

The receiver hitch assembly includes a receiver permanently attached to the towing vehicle and a drawbar removably attached to the receiver. The receiver and the receiver attachment end of the drawbar are oriented vertically, the receiver and its mounting structure being configured for concealment by the rear bumper or other structure of the towing vehicle when the drawbar is removed. The drawbar is configured to clear the rear bumper and/or other structure of the towing vehicle when installed to the receiver. The drawbar is also configured to position the hitch ball at approximately the same level as the center of the receiver when the drawbar is installed. The drawbar may include a longitudinally telescoping center section to allow the hitch ball to be spaced from the structure of the towing vehicle for clearance, load distribution, or other reasons.

16 Claims, 4 Drawing Sheets

RECEIVER HITCH ASSEMBLY

BACKGROUND OF THE INVENTION

1. Field of the Invention

The present invention relates to motor vehicle accessories, and particularly to a receiver hitch assembly having a vertically oriented receiver, the receiver being concealed by the rear bumper of the towing vehicle when the drawbar is removed.

2. Description of the Related Art

Trailer hitches and/or rearward-mounted attachments for removably mounting and/or carrying various articles on a motor vehicle are popular accessories on many motor vehicles. An increasingly popular version of such hitches or attachments is the so-called "receiver hitch," in which a tubular (generally square cross-section) socket or receptacle, known as a receiver, is permanently mounted on the rear of the towing vehicle, and the drawbar with its hitch ball or other trailer attachment is removably installed to the receiver when it is necessary to tow a trailer or mount some external structure to the receiver hitch. While such hitches are quite common on larger motor vehicles, such as pickup trucks, larger vans, and sport utility vehicles, they have become increasingly popular installations on standard automobiles and smaller cars as well.

A major problem with such hitch installations, particularly on smaller automobiles, is the difficulty in providing clearance below the rear bumper valance for the drawbar when it is installed, while at the same time providing ground clearance for the receiver socket or receptacle when the bar is removed from the receiver. One solution has been to cut away a portion of the bumper for clearance, but this is obviously unsightly and not many vehicle owners are willing to damage their vehicles in this manner. Even when the permanent portion of the hitch assembly, i.e., the mounting structure that attaches to the vehicle frame and the receiver that extends from the mounting structure, is mounted in such a manner as to provide clearance from the bumper for the drawbar when installed, the result is an unsightly protrusion of the receiver from beneath the rear bumper of the vehicle, even when the drawbar has been removed from the receiver.

Thus, a receiver hitch assembly solving the aforementioned problems is desired.

SUMMARY OF THE INVENTION

The receiver hitch assembly has a permanently mounted receptacle beneath the rear of the towing vehicle. The receiver or receptacle is mounted in such a manner as to be concealed by the rear bumper valance or other structure of the towing vehicle once installed thereon. The drawbar assembly has a receiver attachment end that fits closely within the receiver, and a hitch pin passes laterally through the receiver and drawbar to secure the drawbar end within the receiver. Both the receiver and the receiver attachment end of the drawbar are oriented vertically when installed to the towing vehicle.

The drawbar has a rearward extending horizontal portion that passes beneath the rear bumper valance and/or other vehicle structure when installed on the towing vehicle, and an upwardly extending arm opposite the drawbar attachment end thereof. Another horizontal component extends rearward from the upper end of the upwardly extending arm, generally coplanar with the center of the receiver when the drawbar is installed thereto. A hitch ball arm comprising an elongate heavy metal plate extends rearward from the rear of the drawbar assembly, and a hitch ball is bolted to the rearward end of the arm. The two vertical portions of the drawbar, with the horizontal portion therebetween, define a squared, generally shaped configuration for the drawbar.

The horizontal portion of the drawbar may comprise two separate components, one telescoping within the other to allow the spacing between the two vertical portions of the drawbar to be adjusted as desired. This provides adjustment for clearance for different dimensions of bumper valances or structures on various towing vehicles, as well as positioning the hitch bail forward or rearward for clearance, load distribution, or other reasons.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The receiver hitch assembly has a receiver with a vertical drawbar receptacle. The drawbar has a receiver attachment end that is oriented vertically when installed in the receiver. The receiver is permanently attached beneath the rear of the vehicle and is concealed, so that only the drawbar is visible when the drawbar is installed to the receiver.

Figure 1:
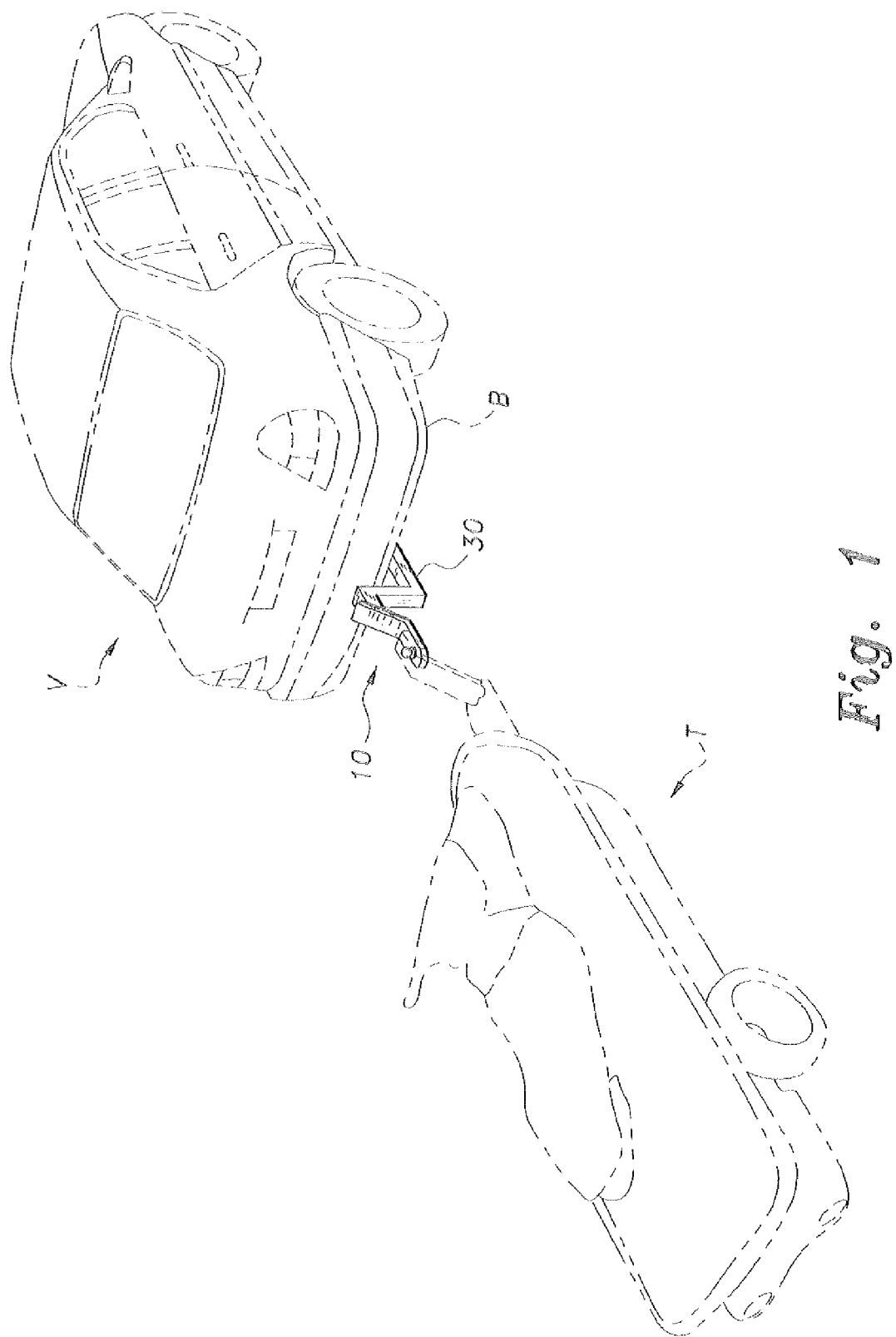
FIG. 1 is an environmental, perspective view of a receiver hitch assembly according to the present invention, shown installed upon a towing vehicle with a trailer connected to the hitch.
Figure 2:
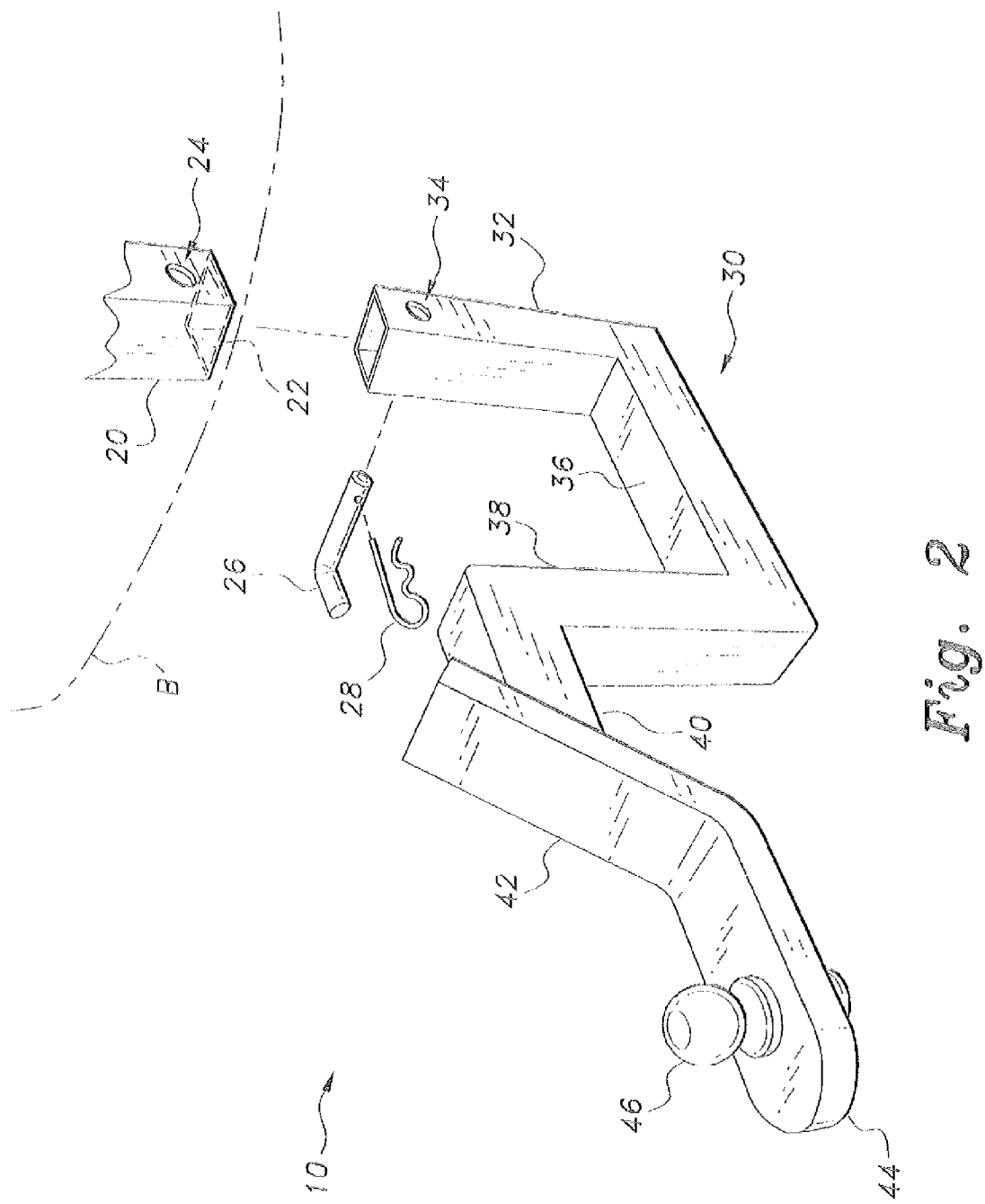
FIG. 2 is a detailed, exploded perspective view of a receiver hitch assembly according to the present invention, showing the drawbar assembly separated from its receiver, the receiver extending from beneath the vehicle forward of the rear bumper assembly, the rear bumper assembly being shown in broken lines to illustrate the receiver.
Figure 3:
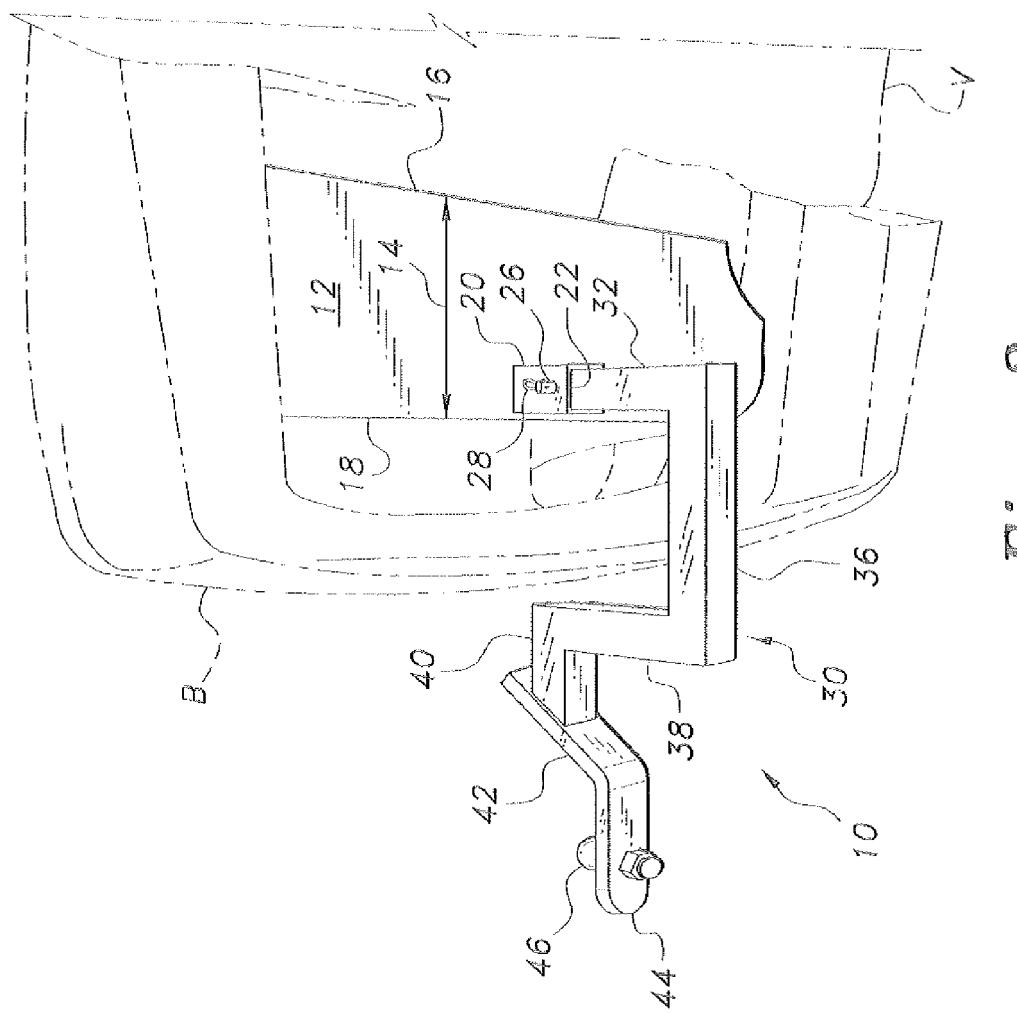
FIG. 3 is an environmental bottom perspective view of a receiver hitch assembly according to the present invention, showing the rearward portion of the towing vehicle, the permanent receiver installation to the towing vehicle, and the drawbar installation to the receiver.

FIG. 1 of the drawings provides an environmental perspective view of the general configuration and installation of a first embodiment of the receiver hitch assembly 10, shown installed upon a towing vehicle V for towing a trailer T. FIGS. 2 and 3 provide detailed perspective views of the receiver hitch assembly 10 installed upon a towing vehicle V. The receiver hitch assembly 10 includes a receiver mounting member 12 comprising a solid, unbroken, rigid plate that is permanently mounted beneath the rear of the towing vehicle V, generally as shown in FIG. 3. The mounting member or plate 12 has a longitudinal span 14 defined by its mutually opposed forward and rearward edges 16 and 18, the receiver 20 depending beneath the receiver mounting member 12 adjacent the rearward edge 18 thereof. The receiver 20 comprises a tubular member having a rectangular cross section, the drawbar attachment receptacle 22 being oriented substantially vertically when installed upon the towing vehicle V. A hitch pin passage 24 is disposed laterally and substantially centrally thereacross, and a hitch pin 26 is removably installed through the hitch pin passage 24 to secure the drawbar assembly thereto. A retaining clip 28 secures removably through a passage in the end of the hitch pin 26 to retain the hitch pin in the receiver 20.

The drawbar 30 has a generally U-shaped forward portion to provide clearance from the rear bumper B of the towing vehicle V, generally as shown in each of the drawings. The drawbar 30 includes a receiver attachment end 32 comprising a square tube dimensioned to fit closely and concentrically within the receptacle 22 of the receiver 20, as shown in FIG. 3 of the drawings, the receiver attachment end 32 being substantially vertically oriented when installed in the receiver 20 due to the concentric assembly of the two components. A hitch pin passage 34 is formed laterally through the distal end of the receiver attachment end 32 of the drawbar 30, the hitch pin passage 34 of the receiver attachment end 32 being aligned concentrically with the hitch pin passage 24 of the receiver 20 when the drawbar 30 is installed thereto. The hitch pin 26 passes through both hitch pin passages 24 and 34 to secure the drawbar 30 to the receiver 20.

A drawbar arm 36 extends from the end of the receiver attachment end 32 of the drawbar 30, and is oriented substantially normal to the receiver attachment end 32. This orients the drawbar arm substantially horizontally when the drawbar 30 is installed to the receiver 20. A riser 38 extends upwardly from the drawbar arm 36 opposite the receiver attachment end 32 of the drawbar 30 and substantially parallel thereto. A hitch bar attachment arm 40 extends from the riser 38, opposite the drawbar arm 36 and substantially parallel and coplanar with the drawbar arm 36. The receiver attachment end 32, drawbar arm 36, riser 38, and hitch bar attachment arm 40 are each preferably formed of square tubing. The receiver attachment end 32, drawbar arm 36, and riser 38 define a rectangular, generally U-shaped configuration to provide clearance from the bumper B of the towing vehicle V when installed thereon, generally as shown in FIGS. 1 and 3 of the drawings.

A hitch bar 42 formed of a solid plate of thick metal extends rearward from the hitch bar attachment arm 40, opposite the arm 40 attachment to the riser 38. The end of the hitch bar attachment arm 40 is preferably beveled, and the attachment portion of the hitch bar 42 has a corresponding slope, as shown in the drawings. The slope of the attachment portion of the hitch bar 42 results in the rearward end 44 of the hitch bar 42, i.e., the end or portion having the hitch ball 46 attached thereto, having a downward and rearward offset, as shown in the various drawings. The hitch ball 46 is conventional, having a threaded bolt or stud that passes therethrough and through a passage (not shown) through the hitch bar 42, and a nut secures the bolt or stud and hitch ball 46 to the hitch bar. The ball 46 may be removed and interchanged with different ball diameters, as needed.

Figure 4:
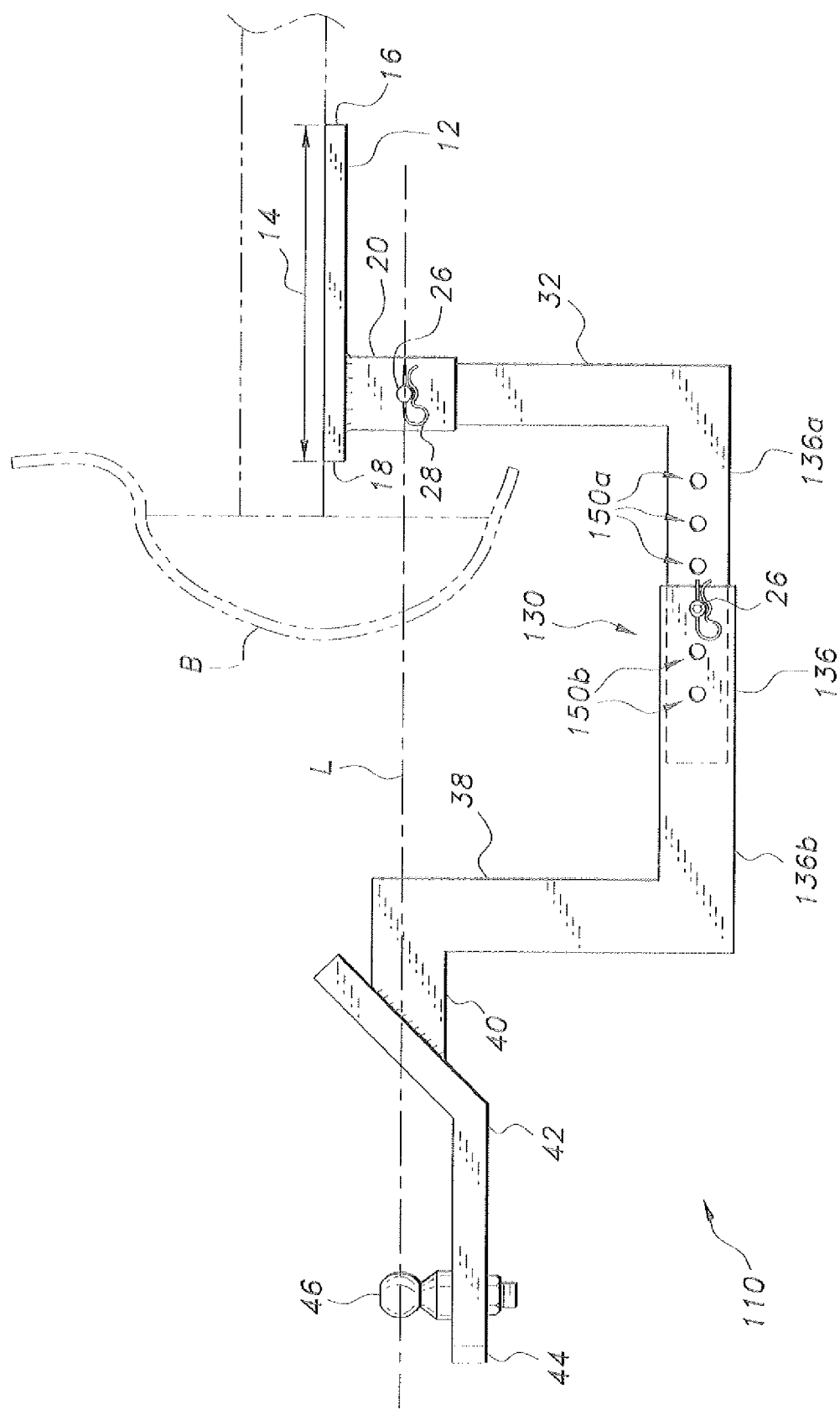
FIG. 4 is a right side elevation view of an alternative embodiment of a receiver hitch assembly according to the present invention, in which the central horizontal portion of the drawbar has two mutually telescoping portions to allow the length of the drawbar to be adjusted.

FIG. 4 of the drawings provides a right side elevation view of an alternative embodiment of the receiver hitch assembly, designated as receiver hitch assembly 110. Many of the components of the hitch assembly 110 are identical to those corresponding components of the hitch assembly 10 of FIGS. 1 through 3, i.e., the receiver mounting member or plate 12, the receiver 20 depending therefrom, and the receiver attachment end 32, riser 38, hitch bar attachment arm 40, hitch bar 42, and hitch ball 46 of the drawbar. However, the drawbar 130 of the receiver hitch assembly 110 of FIG. 4 differs from the embodiment of FIGS. 1 through 3 by having a two-piece drawbar arm 136. The drawbar arm 136 comprises a first or forward portion 136*a* and a second or rearward portion 13611, the two portions 136*a* and 136*b* telescoping concentrically with one another to adjust the length or span of the drawbar arm 136. While FIG. 4 shows the rearward or second portion 136*b* fitting over and around the first or forward portion 136*a*, it will be seen that the forward portion may be larger than the rearward portion to fit thereover, if desired. The length or span of the drawbar arm 136 is fixed by means of a plurality of lateral passages 150*a* through the first or forward arm portion 136*a* and corresponding lateral passages 150*b* through the second or rearward arm portion 136*b*. A hitch pin 26 is used to secure the first and second drawbar arm components 136*a*, 136*b* to one another. Thus, the longitudinal span of the drawbar 130 may be adjusted as desired or required for bumper clearance, load distribution, and/or other factors.

The receiver hitch assembly 110 of FIG. 4 also illustrates another aspect of the device, which holds true for any of the various embodiments disclosed herein. It will be noted in the right side elevation view of FIG. 4 that the center of the hitch ball 46 is aligned horizontally and coaxially with the hitch pin attachment passage 34 of the receiver attachment end 32 of the drawbar 130 along a centerline L parallel to the drawbar arm 136, the hitch pin attachment passage 34 being concentric with the end of the hitch pin 26 installed concentrically therethrough in FIG. 4. This construction elevates the hitch ball 46 to substantially the height of such a ball on a conventional hitch, thereby greatly reducing or eliminating the chance of the trailer tongue or other trailer structure dragging on the surface while being towed. As noted, this feature of the receiver hitch assembly illustrated in FIG. 4 also applies to the hitch assembly embodiment illustrated in FIGS. 1 through 3.

It is to be understood that the present invention is not limited to the embodiments described above, but encompasses any and all embodiments within the scope of the following claims.

I claim:

1. A receiver hitch assembly, comprising:
   a receiver mounting member adapted for attachment to a towing vehicle;
   a receiver depending from the receiver mounting member, the receiver having a hitch pin passage disposed substantially centrally thereacross and a drawbar attachment receptacle configured to extend vertically when the receiver mounting member is attached to the towing vehicle; and
   a drawbar, having:
   a receiver attachment end adapted to be removably installed concentrically within the drawbar attachment receptacle of the receiver, the receiver attachment end having a hitch pin passage disposed thereacross, the receiver attachment end extending substantially vertically when installed within the drawbar attachment receptacle of the receiver;
   an elongated drawbar arm extending from the receiver attachment end of the drawbar, the drawbar arm being substantially normal to the receiver attachment end;
   a riser extending upwardly from the drawbar arm opposite the receiver attachment end, the riser being substantially parallel to the receiver attachment end;
   a hitch bar attachment arm extending rearward from the riser opposite the drawbar arm, the hitch bar attachment arm being substantially parallel to the drawbar arm and coplanar therewith; and
   a hitch bar extending rearward from the hitch bar attachment arm opposite the riser, the hitch bar having a rearward end having a downward and rearward offset.

2. The receiver hitch assembly according to claim 1, wherein the drawbar arm comprises a first portion affixed to the receiver attachment end of the drawbar and a second portion telescopically disposed with the first portion in order to adjust a length of the drawbar arm.

3. The receiver hitch assembly according to claim 1, wherein:
the receiver mounting member comprises a solid, unbroken, rigid plate having a forward edge and a rearward edge opposite the forward edge, the forward edge and the rearward edge defining a longitudinal span; and
the receiver depends from the receiver mounting member adjacent the rearward edge thereof.

4. The receiver hitch assembly according to claim 1, wherein the receiver and the drawbar are formed substantially of square tubing.

5. The receiver hitch assembly according to claim 1, further comprising a hitch ball removably disposed upon the rearward end of the hitch bar, the hitch ball having a center disposed substantially coaxially with the hitch pin passage of the receiver attachment end of the drawbar.

6. The receiver hitch assembly according to claim 1, wherein the hitch bar comprises a solid plate of thick metal.

7. A receiver hitch assembly, comprising:
a receiver mounting member adapted for attachment to a towing vehicle;
a receiver depending from the receiver mounting member, the receiver having a hitch pin passage disposed substantially centrally thereacross and a drawbar attachment receptacle configured to extend vertically when the receiver mounting member is attached to the towing vehicle; and
a drawbar, having:
a receiver attachment end removably insertable concentrically within the drawbar attachment receptacle of the receiver, the receiver attachment end being aligned vertically when installed within the drawbar attachment receptacle of the receiver;
an elongate drawbar arm extending from the receiver attachment end of the drawbar, the drawbar arm being substantially normal to the receiver attachment end, the drawbar arm comprising a first portion affixed to the receiver attachment end of the drawbar and a second portion telescopically disposed with the first portion in order to adjust a length of the drawbar;
the receiver attachment end having a hitch pin passage disposed thereacross;
a riser extending upwardly from the second portion of the drawbar arm opposite the receiver attachment end, the riser being substantially parallel to the receiver attachment end;
a hitch bar attachment arm extending rearward from the riser opposite the drawbar arm, the hitch bar attachment arm being substantially parallel to the drawbar arm and coplanar therewith; and
a hitch bar extending rearward from the hitch bar attachment arm opposite the riser, the hitch bar having a rearward end having a downward and rearward offset.

8. The receiver hitch assembly according to claim 7, wherein:
the receiver mounting member comprises a solid, unbroken, rigid plate having a forward edge and a rearward edge opposite the forward edge, the forward edge and the rearward edge defining a longitudinal span; and
the receiver depends from the receiver mounting member adjacent the rearward edge thereof.

9. The receiver hitch assembly according to claim 7, wherein the receiver and the drawbar are formed substantially of square tubing.

10. The receiver hitch assembly according to claim 7, further comprising a hitch ball removably disposed upon the rearward end of the hitch bar, the hitch ball having a center disposed substantially coaxially with the hitch pin passage of the receiver attachment end of the drawbar.

11. The receiver hitch assembly according to claim 7, wherein the hitch bar comprises a solid plate of thick metal.

12. A receiver hitch assembly, comprising:
a receiver mounting member adapted for attachment to a towing vehicle, the receiver mounting member being a solid, unbroken, rigid plate having a forward edge and a rearward edge opposite the forward edge, the forward edge and the rearward edge defining a longitudinal span;
a receiver depending from the receiver mounting member adjacent the rearward edge thereof, the receiver having a hitch pin passage disposed substantially centrally thereacross and a drawbar attachment receptacle configured to extend vertically when the receiver mounting member is attached to the towing vehicle;
a drawbar, comprising:
a receiver attachment end adapted to be removably installed concentrically within the drawbar attachment receptacle of the receiver, the receiver attachment end extending substantially vertically when installed within the drawbar attachment receptacle of the receiver;
the receiver attachment end having a hitch pin passage disposed thereacross;
an elongate drawbar arm extending from the receiver attachment end of the drawbar, the drawbar arm being substantially normal to the receiver attachment end;
a riser extending upwardly from the drawbar arm opposite the receiver attachment end, the riser being substantially parallel to the receiver attachment end;
a hitch bar attachment arm extending rearward from the riser opposite the drawbar arm the hitch bar attachment arm being substantially parallel to the drawbar arm and coplanar therewith; and
a hitch bar extending rearward from the hitch bar attachment arm opposite the riser, the hitch bar having a rearward end having a downward and rearward offset.

13. The receiver hitch assembly according to claim 12, wherein the drawbar arm comprises a first portion affixed to the receiver attachment end of the drawbar and a second portion telescopically disposed with the first portion in order to adjust a length of the drawbar arm.

14. The receiver hitch assembly according to claim 12, wherein the receiver and the drawbar are formed substantially of square tubing.

15. The receiver hitch assembly according to claim 12, further comprising a hitch ball removably disposed upon the rearward end of the hitch bar, the hitch ball having a center disposed substantially coaxially with the hitch pin passage of the receiver attachment end of the drawbar.

16. The receiver hitch assembly according to claim 12, wherein the hitch bar comprises a solid plate of thick metal.

* * * * *